United States Patent
Sezanayev

(10) Patent No.: US 8,760,300 B2
(45) Date of Patent: Jun. 24, 2014

(54) SYSTEM AND METHOD FOR PREVENTING DRIVING OF A VEHICLE BY AN ALCOHOL INTOXICATED PERSON

(76) Inventor: Gabriel Sezanayev, Flushing, NY (US)

( * ) Notice: Subject to any disclaimer, the term of this patent is extended or adjusted under 35 U.S.C. 154(b) by 121 days.

(21) Appl. No.: 13/455,526

(22) Filed: Apr. 25, 2012

(65) Prior Publication Data
US 2013/0285816 A1 Oct. 31, 2013

(51) Int. Cl.
*G08B 23/00* (2006.01)

(52) U.S. Cl.
USPC ............... 340/576; 340/5.72; 340/5.31

(58) Field of Classification Search
USPC ............... 340/5.71, 5.83, 576
See application file for complete search history.

(56) References Cited

U.S. PATENT DOCUMENTS

| | | | |
|---|---|---|---|
| 4,613,845 A | 9/1986 | Du Bois | |
| 5,220,919 A | 6/1993 | Phillips et al. | |
| 5,793,292 A | 8/1998 | Ivey | |
| 5,944,661 A | 8/1999 | Swette | |
| 5,969,615 A | 10/1999 | Ivey | |
| 6,100,811 A * | 8/2000 | Hsu et al. | 340/5.83 |
| 6,697,732 B1 * | 2/2004 | Gotfried | 701/516 |
| 6,886,653 B1 | 5/2005 | Bellehumeur | |
| 7,236,094 B2 * | 6/2007 | Jones | 340/576 |
| 7,377,186 B2 | 5/2008 | Duval | |
| 7,413,047 B2 | 8/2008 | Brown | |
| 7,671,752 B2 | 3/2010 | Sofer | |
| 7,700,044 B2 | 4/2010 | Lambert | |
| 8,179,271 B2 * | 5/2012 | Kamiki | 340/576 |
| 8,201,437 B2 * | 6/2012 | Takata | 73/23.3 |
| 2001/0028297 A1 * | 10/2001 | Hara et al. | 340/5.62 |
| 2002/0091484 A1 * | 7/2002 | Okajima et al. | 701/207 |
| 2003/0216817 A1 * | 11/2003 | Pudney | 700/17 |
| 2003/0222758 A1 * | 12/2003 | Willats et al. | 340/5.72 |
| 2004/0083031 A1 | 4/2004 | Okezie | |
| 2004/0085211 A1 * | 5/2004 | Gotfried | 340/576 |
| 2004/0183651 A1 * | 9/2004 | Mafune et al. | 340/5.7 |
| 2005/0099310 A1 * | 5/2005 | Jones | 340/576 |
| 2005/0206502 A1 * | 9/2005 | Bernitz | 340/5.82 |
| 2006/0186987 A1 * | 8/2006 | Wilkins | 340/5.53 |
| 2006/0294393 A1 * | 12/2006 | Mc Call | 713/186 |
| 2007/0105072 A1 * | 5/2007 | Koljonen | 434/112 |
| 2008/0061933 A1 * | 3/2008 | Ieda et al. | 340/5.72 |
| 2008/0250829 A1 * | 10/2008 | Kamiki | 70/344 |
| 2009/0090577 A1 * | 4/2009 | Takahashi et al. | 180/272 |
| 2009/0169068 A1 * | 7/2009 | Okamoto | 382/118 |
| 2010/0043524 A1 * | 2/2010 | Takata | 73/23.3 |
| 2010/0121502 A1 | 5/2010 | Katayama | |
| 2010/0269566 A1 | 10/2010 | Carroll | |

* cited by examiner

*Primary Examiner* — Jennifer Mehmood
*Assistant Examiner* — Rufus Point
(74) *Attorney, Agent, or Firm* — Henry M Feiereisen, LLC

(57) ABSTRACT

A system for preventing driving a vehicle by an alcohol intoxicated person, includes at least one alcohol sensor for detecting a presence of an alcohol in a potential driver; a door of a vehicle provided with a door lock; and a unit operatively connected with said sensor and with a door lock and configured for preventing unlocking of said door lock of said door of a vehicle and opening said door of a vehicle when said alcohol level sensor senses an alcohol level in the potential driver which is not within an allowable range.

14 Claims, 3 Drawing Sheets

SYSTEM AND METHOD FOR PREVENTING DRIVING OF A VEHICLE BY AN ALCOHOL INTOXICATED PERSON

BACKGROUND OF THE INVENTION

The present invention relates to systems for preventing driving of a vehicle by alcohol intoxicated persons.

Systems of the above mentioned general type are known in the art. U.S. Pat. No. 4,613,845 discloses an apparatus for preventing the operation of machinery by an operator who is intoxicated, which includes an alcohol sensor and a proximity sensor in the control area of the machinery affecting starting of the machinery.

U.S. Pat. No. 5,220,919 discloses a blood alcohol monitor which measures ethanol levels expelled through a subject's skin to monitor blood alcohol level at regular or random intervals, and the device measures a distance from the subject's skin thereby preventing the subject from moving the device far enough away to provide an inaccurate indication of the amount of alcohol in the blood and providing another tamper indication if the device is removed.

U.S. Pat. No. 5,793,292 discloses a system which inhibits use of a hand-operated machine by detecting in a user toxin in the area of the machine which the user regularly engages.

U.S. Pat. No. 5,944,661 discloses a method of continuing tracking of blood alcohol with the use of a potential and diffusion-controlled electrochemical solid electrolyte sensor that continuously and concurrently measures very low concentration of ethanol vapor at the surface of the skin and also skin properties such as temperature and ionic conductivity.

A system as disclosed in U.S. Pat. No. 5,969,615 discloses a portion of a machine which an operator regularly engages with his or her hands and which is provided with a plurality of passage ways through which a vacuum is applied to draw vapor emitted by the hands of the individual and drawn through a sampling apparatus to produce a single indicative of an alcohol content of the individual.

U.S. patent application publication no. 2004/0083031 discloses an alcohol sensitive apparatus and method for vehicles, in which a blood alcohol sensing device senses that a potential driver of a vehicle has a blood alcohol content above a limit and sends a signal which causes operation of the vehicle to be disabled. A blood alcohol content limit may be transmitted by a transmitter and received by a vehicle.

A system disclosed in U.S. Pat. No. 7,236,094 includes means attached to a covering of a steering wheel for sensing trans-dermal messages from skin of a human being including alcohol content and temperature and logic circuit means activating switching means to shut off electric current in the ignition system to an engine if excessive alcohol content is detected.

U.S. Pat. No. 7,377,186 discloses a sensor system in which a steering wheel has a structural skeleton forming a core within an outer covering and having U-shaped cross-section with ethanol detectors communicating with a wire harness and an electrical circuit for receiving electrical signals indicative of presence of ethanol vapors.

U.S. Pat. No. 7,413,047 discloses an alcohol ignition interlock system with an alcohol concentration reader in combination with a vehicle ignition interlock circuit preventing an intoxicated person from operating a vehicle.

U.S. Pat. No. 7,671,752 discloses a car alcohol monitoring system with a vapor analyzer system for detecting an amount of alcohol in a driver operating the car and a speed controller setting a maximum speed of the car to a predetermined level in the event that the amount of detected alcohol is above a predetermined threshold.

U.S. Pat. No. 7,700,044 discloses a chemical vapor sensor that passively measures a chemical species with high sensitivity and chemical specificity to detect a motor vehicle drive alcohol that exceeds a legal limit of blood alcohol concentration, with a channel of infrared detection making the sensor less costly.

A system disclosed in U.S. patent application publication 2010/0269566 includes an array of sensors imbedded into the steering mechanism of a motorized vehicle and ascertaining the driver's alcohol concentration so as to prevent the operation of motorized vehicle by a driver with excessive alcohol content.

U.S. patent application publication 2010/0921502 discloses an operation control system with a transmitter circuit connector, a transmitter interace, an engine start button switch, a receiver unit, and an engine ECU operating so as to provide the engine's start depending on alcohol level of a driver.

It is believed that the existing systems of this type can be further improved.

SUMMARY OF THE INVENTION

Accordingly, it is an object of the present invention to provide a system for preventing driving of a vehicle by an alcohol intoxicated person existing is a further improvement of existing systems.

In keeping with this object the present invention resides a system for preventing driving of a vehicle by an alcohol intoxicated person including at least one alcohol sensor for detecting a presence of an alcohol in a potential driver; a door of a vehicle providing with a door lock; and means operatively connected with the sensor and with the door lock and preventing unlocking of the door lock and opening the door of the vehicle only when the sensor senses an alcohol level in the potential driver outside of an allowable range.

When the system is designed in accordance with the present invention, if the alcohol level of the potential driver is outside of an allowable range, the door lock of the vehicle simply cannot be unlocked and the door vehicle cannot be opened.

In accordance with a further feature of the present invention the alcohol sensor can be arranged on a driver's door of the vehicle so as to prevent or allow opening of the door lock of the driver's door of the vehicle.

Alcohol level sensors can be arranged on all doors of the vehicle so that none of the door locks of the vehicle can be opened if at least one sensors detects an alcohol level in the potential driver outside of the allowable range and none of the doors of the vehicle can be opened.

The alcohol level sensor can be also located on a key, so that when a driver or another person tries to open any door with the key, the door of the vehicle can be opened only when the alcohol level detected by the sensor is within the allowable range.

The sensors can be provided on a key which is used for mechanically opening of the door lock by insertion of the key into a keyhole, and also on a remotely opening key for operating of the door lock remotely.

In accordance with the present invention the sensors can be provided both on the door of the vehicle and on the door key to prevent unlocking of the door locks and opening of the doors if any of the sensors detects an alcohol level in the potential driver outside of the allowable range.

In accordance with additional feature of the present invention the alcohol level sensor is also operatively connected with an ignition system of a vehicle to provide an additional guarantee that the vehicle cannot be driven by a driver if the sensor senses the alcohol level of the potential driver outside of the allowable range. Thus the double protection is provided by blocking unlocking of a door/doors of the vehicles and additionally by blocking operation of the ignition system if the sensor/sensors sense an alcohol level in the potential driver which is not outside an allowable range.

In accordance with another important feature of the present invention the alcohol level sensor sends a signal to a door lock, an ignition system, or to both remotely, so that no wires are needed, which can complicate the construction, installation and operation of inventive system.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
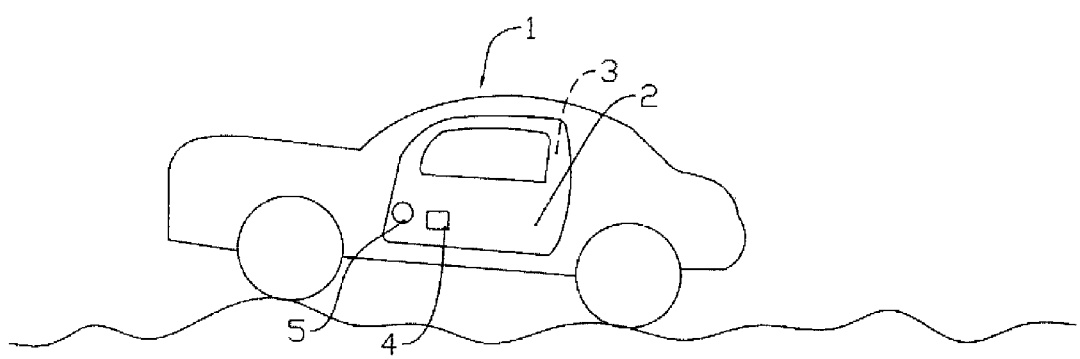
FIG. 1 is a view showing a vehicle which is provided with an inventive system for preventing its driving by an alcohol intoxicated person.

FIG. 1 shows a vehicle provided with a system for preventing its driving by an alcohol intoxicated person and identified as a whole with reference numeral 1. The vehicle has for example two doors including a driver-side door 2 and a passenger-side door 3. The driver-side door 2 is provided with an alcohol level sensor 4.

The alcohol level sensor 4 senses an alcohol level in a potential driver of the vehicle 1. The alcohol level sensor 4 can be based on any known alcohol sensing principles. For example, it can sense an alcohol in a potential driver based on sensing an air exhaled by a potential driver when he approaches the driver-side door 2 of a vehicle 1. The driver's door 2 has a door lock which is identified with reference numeral 5. The detail construction of the door lock 5 is not a subject matter of the present invention and therefore is not described in detail. The door lock 5 of the driver-side door 2 is operatively connected with the sensor 4.

If the sensor 4 senses that the alcohol level of the potential drive is absent or within an allowable range, it sends a signal to the door lock 5 and the door lock can open either automatically or by a key. If however to the contrary the sensor 4 senses an alcohol level in a potential driver which is outside of the allowable range, the sensor sends a signal to the door lock 5 and the door lock 5 cannot open either automatically or by a key. In the latter case a potential driver of the vehicle cannot enter the vehicle through the locked driver-side door.

Figure 2:
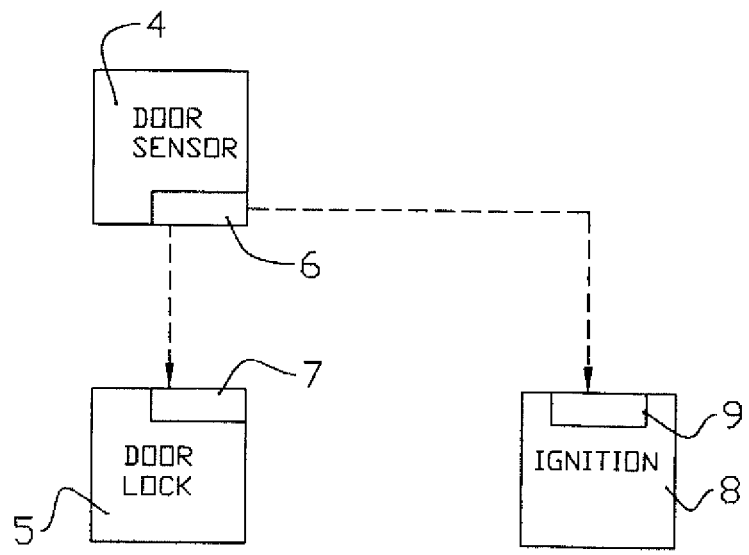
FIG. 2 is a view showing a system for preventing driving of a vehicle by an alcohol intoxicated person in accordance with a first embodiment of the present invention with a door-mounted sensor.

The above described system is schematically shown in FIG. 2 which illustrates the alcohol level sensor 4 and the door lock 5 operatively connected with one another. In a preferable embodiment of the present invention the alcohol level sensor 4 provided on the driver-vehicle side door 2 has a transmitter 6 while the door lock 5 has a receiver 7, so that the signals of the door sensor 5 are sent by the transmitter 6 and remotely received by the receiver 7 of the door lock 5, thus eliminating the need for a wire connection between the door sensor 4 and the door lock 5. The wireless transmission between the transmitter 6 of the door sensor 4 and the receiver 7 of the door lock 5 can be performed by any known wireless transmission technology, such as for example by a radio frequency wireless transmission.

In accordance with a further feature of the present invention the door sensor 4 is also operatively connected with a vehicle ignition system identified in FIG. 2 with reference numeral 8. If the door sensor 4 senses that an alcohol level in a potential driver is within an allowable range, it sends a corresponding signal to the vehicle ignition system 8, and in particular by its transmitter 6 to a receiver 9 of the vehicle ignition system 8 and the vehicle ignition system can be started to drive the vehicle. If however the door sensor 4 senses that an alcohol level in a potential driver is not outside an allowable range, it sends another signal to the vehicle ignition system 8, preventing the vehicle ignition system 8 from operation, so that the vehicle ignition system cannot be started and the vehicle cannot be driven.

It is believed to be clear that the vehicle ignition system 8 can include logic circuits which distinguish between a signal corresponding to an alcohol level of a potential driver located within an allowable range and a signal indicative of an alcohol level in a potential driver which is outside the allowable range and also door lock actuating means to correspondingly start or not start the vehicle ignition system 8.

Figure 3:
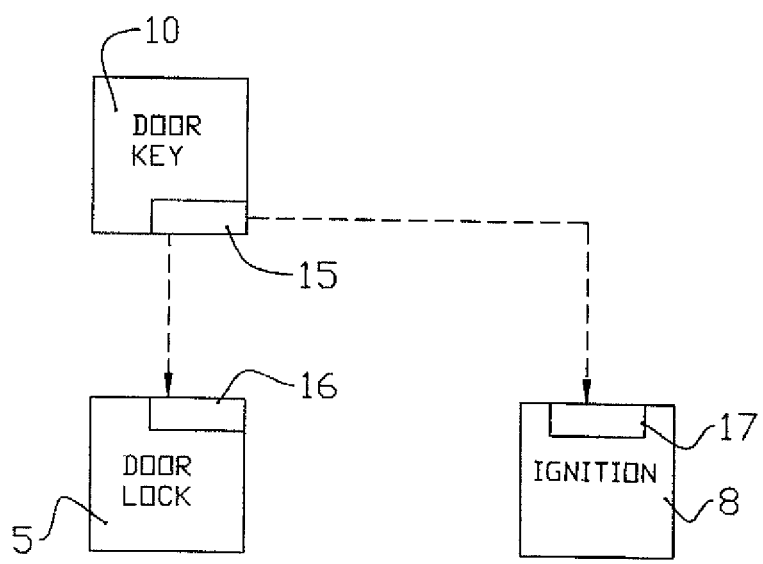
FIG. 3 is a view showing a system for preventing driving of a vehicle by an alcohol intoxicated person in accordance with a first embodiment of the present invention with a door key-mounted sensor.

FIG. 3 illustrates another embodiment of the present invention. Here an alcohol level sensor 10 is located not on a vehicle door, but instead on a door key 10. The door key-located sensor 10 senses whether an alcohol level in a potential driver is within an allowable range or outside of the allowable range through touching the door key 10 of fingers and/or hand by the potential driver. Such a sensor can be formed as a known transdermal sensor which can sense an alcohol level in blood of a potential driver through his skin, as known in the art.

Figure 5A:
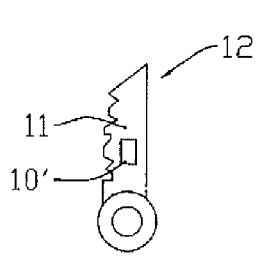
FIGS. 5a and 5b are views showing a mechanically operated key and a remotely operated key provided with a sensor for sensing an alcohol level of a potential driver of a vehicle provided with the inventive system.
Figure 5B:
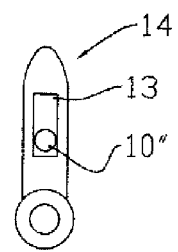

FIG. 5a shows an alcohol level a sensor 10' which is arranged directly on a body 11 of a mechanical key 12, while FIG. 5b shows an alcohol level sensor 10" located on a push button 13 of a remotely operated key 14. When a potential driver touches the vehicle door key 10, 10', 10" his alcohol level is sensed and corresponding signals are sent to the door lock 5, the vehicle ignition system 8, or both remotely by means of a transmitter 15 and receivers 16 and 17 so as to allow opening of the door lock 5 and starting of the vehicle ignition system 8, or to prevent the same.

Figure 4:
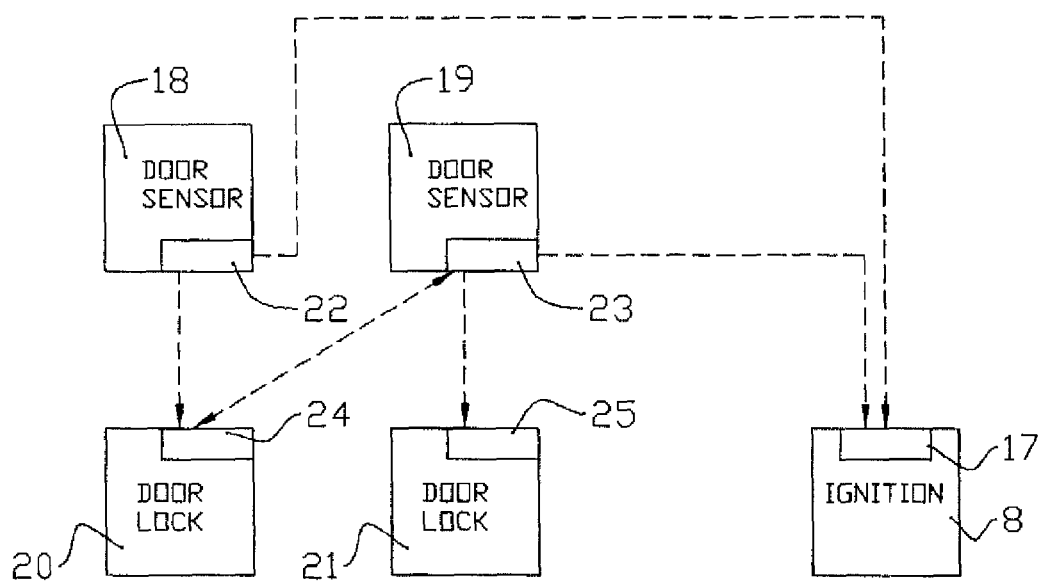
FIG. 4 is a view showing an inventive system for preventing driving of a vehicle by an alcohol intoxicated person with a plurality of door sensors.

FIG. 4 shows a further embodiment of the present invention. Here the system is designed so that depending on signals from alcohol sensing means it is possible or impossible to open not only the driver's door of the vehicle 1, but also any door of the vehicle. This system is illustrated for a vehicle which has two alcohol level sensors 18 and 19 mounted on two door and having transmitters 22 and 23 correspondingly. The doors have door locks 20 and 21 provided with receivers 24 and 25. Each door sensor 18 and 19 is connected with both door locks 20 and 21.

If a driver tries to enter the vehicle 1 not only through the driver's door but through another door of the vehicle, the sensor of the door which the driver tries to open, either on the driver-side door or on the passenger side will sense the alcohol level in his blood and depending whether the alcohol level is within an allowable range or outside of the allowable range, will allow opening of the door locks 20 and 21 of both doors or prevents opening of the door locks 20 and 21 both of the doors of the vehicle. Each of the door sensors 18 and 19 can be also operatively connected with the vehicle ignition system 8 and therefore the ignition system 8 can start only if the alcohol level sensed by all sensors 18 and 19 on all doors is within an allowable range.

It will be understood that each of the elements described above, or two or more together, may also find a useful application in other types of constructions differing from the type described above.

While the invention has been illustrated and described as embodied in a system for preventing operation of a vehicle by an intoxicated person, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A system for preventing driving a vehicle by an alcohol intoxicated person, comprising at least one alcohol sensor for detecting a presence of an alcohol in a potential driver; a door of a vehicle provided with a door lock; and means operatively connected with said alcohol sensor and said door lock of the door of a vehicle and configured for sending a signal from said alcohol sensor to said door lock of said door of a vehicle indicative of whether an alcohol level in the potential driver is within an allowable range or not within an allowable range and preventing unlocking of said door lock of said door of a vehicle and opening said door of a vehicle when said alcohol level sensor senses an alcohol level in the potential driver which is not within an allowable range and thereby preventing the potential driver with an alcohol level which is not within the allowable range from entering a vehicle through said door.

2. A system as defined in claim 1, wherein said alcohol sensor is arranged on said door of said vehicle which is a driver's door of a vehicle, and said means is operatively connected with said door lock of said driver's door of a vehicle and thereby prevent the potential driver with an alcohol level which is not within an allowable range from entering the vehicle through the driver's door.

3. A system as defined in claim 1, further comprising a plurality of alcohol sensors, and a plurality of said vehicle doors each provided with said door lock and with a respective one of said alcohol sensors, said means being configured so that if any of said alcohol sensors senses an alcohol level which is not within an allowable range none of said locks of said vehicle doors can be unlocked and thereby prevent the potential driver with an alcohol level which is not within an allowable range from entering a vehicle through any of the doors of a vehicle.

4. A system as defined in claim 1, wherein said means operatively connected with said alcohol sensor and said door lock of said door of a vehicle is configured as remotely operating means.

5. A system as defined in claim 4, wherein said remotely operating means includes a transmitter associated with said alcohol sensor and transmitting signal from said alcohol sensor and a receiver associated with said door lock of said door of a vehicle and remotely receiving said signal, for unlocking of said door lock or not unlocking said door lock of said door of a vehicle.

6. A system as defined in claim 1, further comprising a door key for opening and closing of said door lock of said door of a vehicle, wherein said alcohol sensor is arranged on said door key.

7. A system as defined in claim 1, further comprising a vehicle ignition system, wherein said means is also operatively connected with said vehicle ignition system and configured for preventing operation of said vehicle ignition system when said alcohol level sensor senses an alcohol level in the potential driver which is not within an allowable range.

8. A vehicle, comprising a door provided with a door lock; and means for preventing driving a vehicle by an alcohol intoxicated person, said preventing means including at least one alcohol sensor for detecting a presence of an alcohol in a potential driver, and means operatively connected with said alcohol sensor and with said door lock and configured for sending a signal from said alcohol sensor to said door lock of said door of a vehicle indicative of whether an alcohol level in the potential driver is within an allowable range or not within an allowable range and preventing unlocking of said door lock of said door of a vehicle and opening said door of a vehicle when said alcohol sensor senses an alcohol level in the potential driver which is not within an allowable range and thereby preventing the potential driver with an alcohol level which is not within an allowable range from entering a vehicle through said door.

9. A vehicle as defined in claim 8, wherein said alcohol sensor is arranged on said door of a vehicle which is a driver's door, and said means is operatively connected with said door lock of said driver's door of a vehicle and thereby prevents the potential driver with an alcohol level which is not within an allowable range from entering a vehicle through the driver's door.

10. A vehicle as defined in claim 8, further comprising a plurality of said alcohol sensors, and a plurality of said vehicle doors each provided with said door lock and with a respective one of said alcohol sensors, said means being configured so that if any of said alcohol sensors senses an alcohol level which is not within an allowable range none of said locks of said vehicle doors can be unlocked and thereby prevents the potential driver with an alcohol level which is not within an allowable range from entering a vehicle though any of the doors of a vehicle.

11. A vehicle as defined in claim 8, wherein said means operatively connected with said alcohol sensor and said door lock of said door of a vehicle is configured as remotely operating means.

12. A vehicle as defined in claim 11, wherein said remotely operating means includes a transmitter associated with said alcohol sensor and transmitting a said signal from said alcohol sensor and as receiver associated with said door lock of said door of a vehicle and remotely receiving said signal, for unlocking of said door lock or not unlocking said door lock of said door of a vehicle.

13. A vehicle as defined in claim 8, further comprising a door key for opening and closing said door lock of said door of a vehicle, wherein said alcohol sensor is arranged on said door key.

14. A vehicle as defined in claim 8, further comprising a vehicle ignition system, wherein said means is operatively connected with said ignition system and configured to prevent operation of said ignition system when said alcohol sensor senses an alcohol level in the potential driver which is not within an allowable range.

* * * * *